(12) United States Patent
Librojo Garing

(10) Patent No.: US 8,112,178 B2
(45) Date of Patent: Feb. 7, 2012

(54) ROBOTIC PLATFORM FOR AUTONOMOUS AUTOMOTIVE VEHICLE DEVELOPMENT

(75) Inventor: Francis Xavier Librojo Garing, Paramus, NJ (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1011 days.

(21) Appl. No.: 11/970,215

(22) Filed: Jan. 7, 2008

(65) Prior Publication Data
US 2009/0177322 A1 Jul. 9, 2009

(51) Int. Cl.
G05D 1/00 (2006.01)
G05B 19/00 (2006.01)

(52) U.S. Cl. .............. 700/258; 901/1; 700/245; 701/22; 701/23; 701/28; 180/209; 180/167; 180/169; 280/785; 280/797

(58) Field of Classification Search .................. 700/258; 901/1; 701/22, 23, 28; 180/209, 906, 169, 180/167; 280/785, 797
See application file for complete search history.

(56) References Cited

U.S. PATENT DOCUMENTS

| | | | | |
|---|---|---|---|---|
| 4,700,960 | A * | 10/1987 | Miki et al. | 180/414 |
| 4,881,756 | A * | 11/1989 | Kumasaka et al. | 280/785 |
| 5,777,243 | A * | 7/1998 | Kewish | 73/865.6 |
| 5,927,423 | A * | 7/1999 | Wada et al. | 180/209 |
| 5,974,347 | A * | 10/1999 | Nelson | 701/22 |
| 5,986,583 | A * | 11/1999 | Nakano et al. | 340/988 |
| 6,454,036 | B1 * | 9/2002 | Airey et al. | 180/167 |
| 6,530,445 | B1 * | 3/2003 | Flowers et al. | 180/208 |
| 6,578,925 | B1 * | 6/2003 | Baker et al. | 298/17.6 |
| 6,674,687 | B2 * | 1/2004 | Zeitzew | 367/6 |
| 6,728,608 | B2 * | 4/2004 | Ollis et al. | 701/28 |
| 6,751,535 | B2 * | 6/2004 | Mori | 701/23 |
| 6,877,574 | B2 * | 4/2005 | Thompson et al. | 180/65.1 |
| 6,888,353 | B1 * | 5/2005 | Wiegert | 324/345 |
| 7,114,047 | B2 | 9/2006 | Iwasaki et al. | |
| 7,318,493 | B2 * | 1/2008 | Medina | 180/167 |
| 7,766,388 | B1 * | 8/2010 | Marino et al. | 280/781 |
| 7,900,658 | B2 * | 3/2011 | Osborne et al. | 141/2 |
| 7,980,594 | B2 * | 7/2011 | Hendriks et al. | 280/781 |
| 8,020,658 | B2 * | 9/2011 | Rajasingham | 180/209 |
| 2009/0177322 | A1 * | 7/2009 | Librojo Garing | 700/258 |

OTHER PUBLICATIONS

David John Hall, Flexible Robot Platform for Autonomous Research, University of Tasmania, Nov. 2005, 66 pages.

* cited by examiner

Primary Examiner — Thomas Black
Assistant Examiner — Wae Louie
(74) Attorney, Agent, or Firm — Gifford, Krass, Sprinkle, Anderson & Citkowski, P.C.

(57) ABSTRACT

A robotic platform for autonomous automotive vehicle development. The platform includes a frame having a plurality of wheels rotatably mounted to the frame. A motor mechanism is associated with at least one of the wheels and the motor mechanism is responsive to drive signals to rotatably drive its associated wheel. At least one sensor is mounted to the vehicle which provides an output signal representative of a parameter relevant to the position of the robotic platform. A programmable control circuit is programmed to generate drive signals in response to the sensor output(s) to simulate the operation of an automotive vehicle for vehicle development.

14 Claims, 3 Drawing Sheets

ROBOTIC PLATFORM FOR AUTONOMOUS AUTOMOTIVE VEHICLE DEVELOPMENT

BACKGROUND OF THE INVENTION

I. Field of the Invention

The present invention relates to a robotic platform for autonomous automotive vehicle development.

II. Description of Related Art

Modern automotive vehicles typically include numerous electronic systems for safety and collision avoidance systems, as well as navigation systems. Such systems, furthermore, typically employ processors, such as microprocessors, which control the operation of the system and perform the various decisions required by the operation of the system.

The development and debugging of software utilized to control the operation of the processors in these various safety, anti-collision and navigation systems has previously represented a time-consuming process. Furthermore, in order to verify the proper operation of the systems during development, it has been the previous practice to implement these systems on an automotive vehicle during all stages of the system development.

The implementation of the systems on an automotive vehicle during the entire development of the system, however, has proven disadvantageous for a number of reasons. First, the relatively high cost of the automotive vehicle itself represents a significant expenditure in the development of the safety, anti-collision and navigation systems. Additionally, in some situations, such as an anti-collision system, it is necessary to subject the automotive vehicle to a potential collision in order to ensure proper operation of the anti-collision system. In the event the anti-collision system does not operate as intended, which typically occurs during the early development of the anti-collision system, damage to the automotive vehicle can result thus further increasing the development cost of these automotive systems.

SUMMARY OF THE PRESENT INVENTION

The present invention provides a robotic platform for autonomous automotive vehicle development which overcomes all of the above-mentioned disadvantages of the previously known systems for vehicle development.

In brief, the robotic platform of the present invention includes a frame having a plurality of wheels rotatably mounted to the frame. In one embodiment, the frame is generally rectangular and four wheels are rotatably mounted to the frame at the corners of the frame in a fashion analogous to an automotive vehicle.

A motor mechanism is associated with at least one of the wheels, and preferably with each wheel so that the wheels may be independently rotatably driven relative to each other. A linear actuator is also associated with the steerable wheels of the platform to simulate vehicle steering. These motor mechanisms and linear actuators, furthermore, are responsive to drive signals from a control circuit.

Preferably, the frame includes multiple mounting means for the platform wheels. Consequently, vehicles having different wheel bases and track width may be simulated by changing the position of the attachment of the wheels to the frame.

At least one sensor is mounted to the vehicle which provides an output signal representative of a parameter relevant to the position of the robotic platform. These sensors can include, for example, a GPS receiver, a camera, a radar system, such as a dedicated short range radar system of the type used in automotive vehicles, and the like.

The control circuit includes a processor, such as a microprocessor, which is programmed to generate the drive signals to one or more of the drive mechanisms. This control circuit is responsive to the output from at least one of the sensors to simulate the operation of an automotive vehicle. However, the overall size of the robotic platform is much smaller than an automotive vehicle so that relatively high speeds of an automotive vehicle may be simulated at a much slower speed.

Consequently, the control circuit for the robotic platform may be programmed not only to simulate different types of automotive vehicles but also programmed to implement safety, anti-collision and/or navigation systems for the automotive vehicle.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
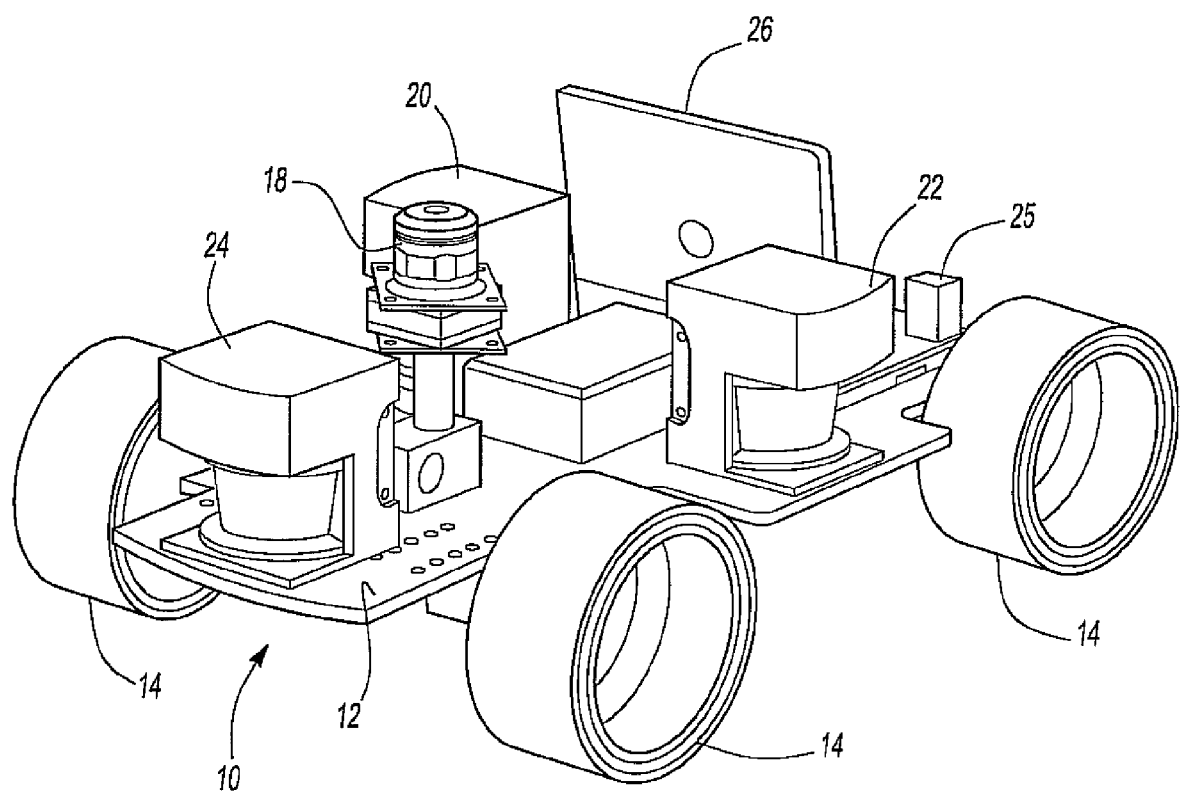
FIG. 1 is an elevational view illustrating a preferred embodiment of the robotic platform of the present invention.

With reference first to FIG. 1, an embodiment of the robotic platform 10 is there shown for autonomous automotive vehicle development. The robot 10 includes a chassis or frame 12 which is rigid in construction and much smaller that an actual automotive vehicle. The frame 12 is preferably made of a lightweight metal material, such as extruded aluminum. Aluminum is also relative inexpensive to obtain and easily machined.

The frame 12 is preferably rectangular in shape and has a small fraction, less than one half;, the size of a typical automotive vehicle. Preferably, the overall length of the frame 12 is less than five feet while the width of the frame 12 is smaller than its length.

Figure 3:
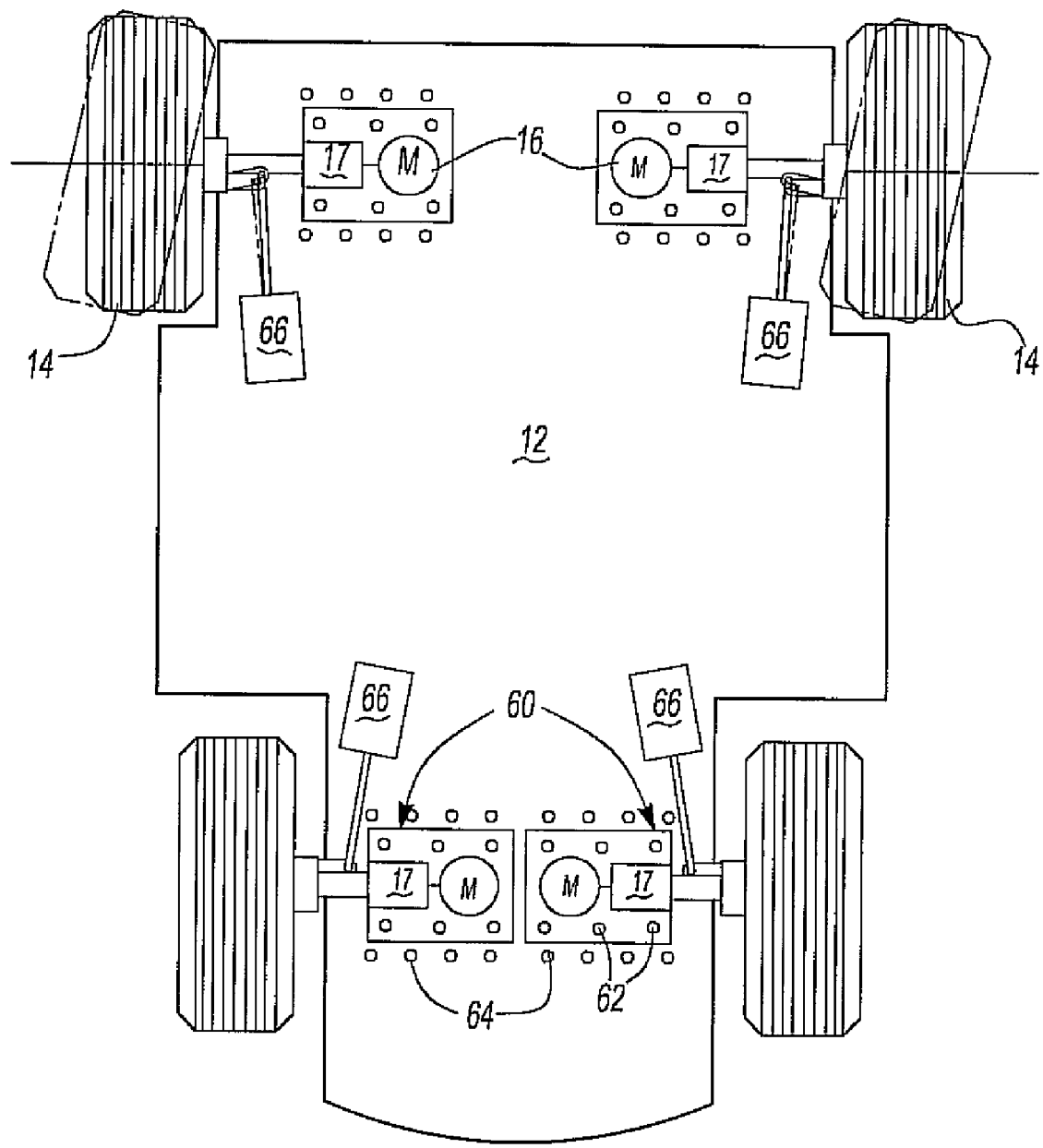
FIG. 3 is a bottom plane view of the robotic platform.

With reference to FIGS. 1 and 3, wheel 14 is rotatably mounted to each corner of the frame 12 so that the wheels 14 support the frame 12 above a ground support surface. A motor mechanism 16, such as a servomotor, is rotatably drivingly connected to at least one and preferably all of the wheels 14. Consequently, the wheels 14 may be independently rotatably driven by the servomotor 16 in response to drive signals provided to the motor mechanism 16.

A gear box 17 is drivingly connected between each motor mechanism 16 and its associated wheel 14. The gear boxes 17 provide the torque to rotatably drive the wheels and also preferably have integrated controllers and feedback circuits to facilitate accurate control of the overall wheel drive system.

As best shown in FIG. 3 a mounting means 60, such as a plate, is associated with each wheel. The mounting means 60 are attached to the frame 12 by fasteners 62 each of which extends into one of a plurality of spaced holes 64 provided in the frame 12 for each wheel 12.

The mounting means 60 thus enable the position of the wheels 14 to be varied relative to the frame 12 to simulate vehicles having different wheel bases and track width by attaching the mounting means 60 to different holes 64 in the frame 12. Other means, of course, may also be used to adjust the position of the wheels 14 on the frame 127. Likewise, the wheels 14 having different diameters are attachable to the frame to simulate different wheel sizes.

A linear actuator 66 is associated with each steerable wheel 14, typically the front wheels, of the simulated vehicle which controls the pivotal position of its associated wheel about a vertical axis as shown in phantom line. These linear actuators 66, under computer control, enables different steering attributes to be implemented via simulated steering motions through software control. This allows fill drive train customization and representation by the platform 10.

At least one, and preferably several, sensors are mounted to the frame 12 and each sensor provides an output signal representative of a parameter relevant to the position of the frame. For example, these sensors may include a vision sensor or camera 18 which provides an output from the camera 18 representative of the visible view of the robotic platform 10, and thus the positions of other objects relative to the platform 10.

These sensors may also include a rangefinder 20 which provides an output signal representative of the distance between the robotic platform 10 and various objects within the range of the rangefinder 20. Similarly, a laser rangefinder 22 may also generate output signals representative of the distance between the platform 12 and objects which may be relatively distant from the platform 10.

The sensors may also include a global positioning system (GPS) receiver 24. The receiver 24 generates an output signal representative of the geographic position of the robotic platform 10 in the well known fashion.

A dedicated short range radar system 25 may also be mounted to the frame 12. Such a dedicated short range radar system may be utilized to communicate with objects outside of the robotic platform, such as traffic light warning signals, other vehicles, and the like.

All of the signals from the sensors 18-24 are coupled as input signals to a programmable control circuit 26, such as a laptop computer. The control circuit 26 generates the drive output signals to the motor mechanism in response to the signals from one or more of the sensors 18-24 to simulate the operation of an automotive vehicle. Furthermore, the control circuit 26 may be programmed differently to simulate different types of automotive vehicles.

For example, the control circuit may be programmed to only drive the front two wheels 14 by the motor mechanism 16 and associated gear boxes 17 in order to simulate a front wheel drive. Conversely, the control circuit 26 generates output drive signals to only the rear two wheels 14 in order to simulate the operation of a rear wheel drive automotive vehicle and, similarly, to all four wheels 14 to simulate an all wheel drive vehicle. Likewise, the control circuit 26 is programmed to simulate other types of parameters for different vehicles, such as braking distance, turning radius, etc. which varies between different types of vehicles.

Figure 2:
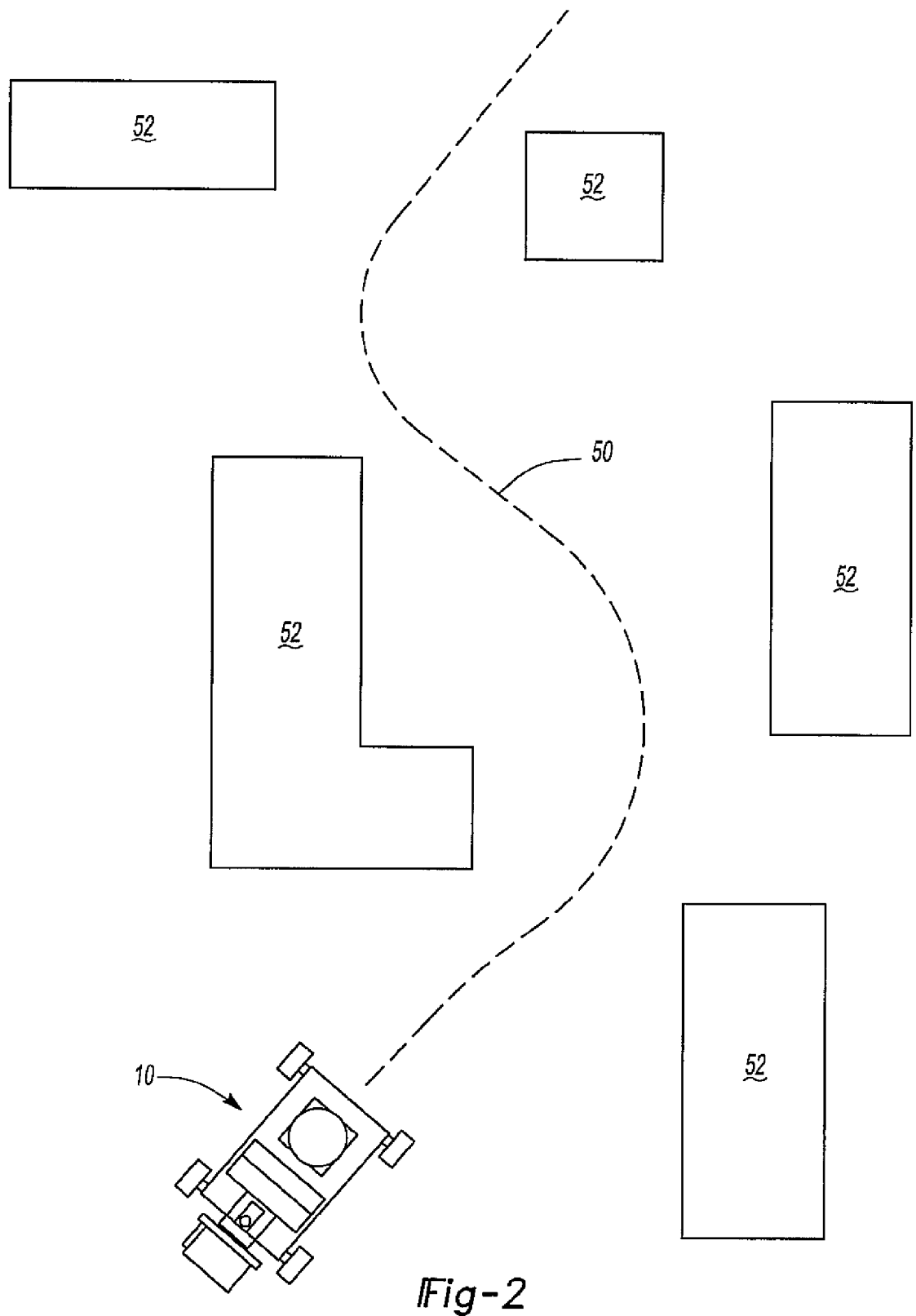
FIG. 2 is a top diagrammatic view illustrating the operation of the robotic platform through a series of obstacles.

With reference now to FIG. 2, the robotic platform 10, once programmed to simulate a particular type of vehicle and with the wheels 14 attached to the frame 12 by the mounting means 60 may be used for the development of automotive safety, collision avoidance and navigation systems. By way of example only, the robotic platform 10 is illustrated in FIG. 2 as traveling a route 50 between various objects 52. Under control of anti-collision or object avoidance software, the robotic platform 10 travels the route 50 which avoids all of the objects 52. However, during the development of some software, and when the software is not operating in the desired fashion, the robotic platform 10 may contact one of the objects 52. In that event, the object avoidance or collision avoidance software may be repeatedly improved and "debugged" until it operates in the appropriate fashion. During this entire development, however, the robotic platform 10 remains undamaged due to both its circuit construction and relatively low speed operation.

The relatively small size of the robotic platform 10 as compared to the size of an automotive vehicle also enables the robotic platform 10 to simulate the operation of the automotive vehicle at relatively slow speeds which, when scaled, form an accurate simulation of high speed movement of the automotive vehicle. This low speed of the robotic platform 10 also facilitates the development of the vehicle software.

Still other types of systems may be easily simulated by the robotic platform 10. For example, using dedicated short range radar, the automotive vehicle 10 may communicate with other devices, such as a traffic light warning system, other vehicles and development of the software for the vehicle.

From the foregoing, it can be seen that the present invention provides a simple and yet effective robotic platform to facilitate in the development of software for automotive vehicle development and particularly for the safety systems, anti-collision systems and navigation systems for the automotive vehicle. Having described my invention, however, many modifications thereto will become apparent to those skilled in the art to which it pertains without deviation from the spirit of the invention as defined by the scope of the appended claims.

The invention claimed is:

1. A robotic platform for autonomous automotive vehicle development comprising:
   a frame,
   a plurality of wheels,
   said frame having a plurality of spaced apart mounting holes associated with each wheel,
   wherein each wheel is adjustably attachable to different frame mounting holes of the frame mounting holes associated with each said wheel to thereby vary the wheel base of the vehicle,
   a motor mechanism associated with at least one of said wheels, said motor mechanism responsive to drive signals to rotatably drive its associated wheel,
   at least one sensor mounted to said vehicle, said at least one sensor providing a sensor output signal representative of a parameter relevant to the position of the frame,
   a programmable control circuit programmed to generate said drive signals in response to said at least one sensor output to simulate the operation of an automotive vehicle.

2. The invention as defined in claim 1 wherein said sensor comprises a global position system receiver.

3. The invention as defined in claim 1 wherein said sensor comprises a camera.

4. The invention as defined in claim 1 wherein said sensor comprises a radar system.

5. The invention as defined in claim 1 wherein said sensor comprises a laser rangefinder.

6. The invention as defined in claim 1 wherein said motor mechanism comprises a servomotor.

7. The invention as defined in claim 1 wherein said frame includes a base having four wheels, said wheels being spaced apart from each other.

8. The invention as defined in claim 7 wherein said motor mechanism comprises at least two servomotors drivingly connected with two of said wheels.

9. The invention as defined in claim 7 wherein said motor mechanism comprises at least four servomotors, one servomotor drivingly connected with each of said wheels.

10. The invention as defined in claim 1 wherein said frame is less than one half the size of the simulated automotive vehicle.

11. The invention as defined in claim 1 wherein said control circuit is programmable to simulate different automotive vehicles.

12. The invention as defined in claim 1 wherein said control circuit comprises a computer.

13. The invention as defined in claim 1 and comprising a gearbox operatively disposed between each motor mechanism and its associated wheel.

14. The invention as defined in claim 1 and comprising a linear actuator associated with at least one wheel to control the pivotal position of its associated wheel about a vertical axis.

* * * * *